United States Patent
Kamata et al.

[11] Patent Number: 6,107,379
[45] Date of Patent: *Aug. 22, 2000

[54] AUTOMOBILE VIBRATION-ISOLATING RUBBER COMPOSITION AND AUTOMOBILE VIBRATION-ISOLATING DEVICE

[75] Inventors: Tsuneo Kamata; Makoto Niki; Yoshihide Ueda, all of Osaka, Japan

[73] Assignee: Toyo Tire & Rubber Co., Ltd., Osaka, Japan

[ * ] Notice: This patent is subject to a terminal disclaimer.

[21] Appl. No.: 09/133,997

[22] Filed: Aug. 14, 1998

[51] Int. Cl.$^7$ ..................................................... C08K 5/32
[52] U.S. Cl. ..................... 524/259; 524/496; 524/525; 524/526; 524/571; 524/575.5; 525/236; 525/242; 525/333.2; 525/333.3; 525/540
[58] Field of Search ..................... 524/259, 496, 524/525, 526, 571, 575.5; 525/236, 242, 333.2, 333.3, 540

[56] References Cited

U.S. PATENT DOCUMENTS 5,798,416  8/1998  Kamata et al. ........................ 524/259
5,844,050  12/1998  Fukahori et al. ....................... 525/351

*Primary Examiner*—Samuel A. Acquah
*Attorney, Agent, or Firm*—Jordan and Hamburg LLP

[57] ABSTRACT

Provided is an automobile vibration-isolating rubber composition, characterized in that a rubber component comprises from 10 to 80% by weight of a polybutadiene rubber which is obtained through the polymerization using a rare-earth element catalyst and which has a cis content of 97% or more, and from 90 to 20% by weight of at least one type of a rubber selected from a natural rubber, a synthetic polyisoprene rubber and a polystyrene-butadiene copolymer rubber. The automobile vibration-isolating rubber obtained by vulcanizing the rubber composition of the present invention has a low dynamic factor compared to the conventional product, making it possible to decrease a room noise caused by a road noise.

12 Claims, 3 Drawing Sheets

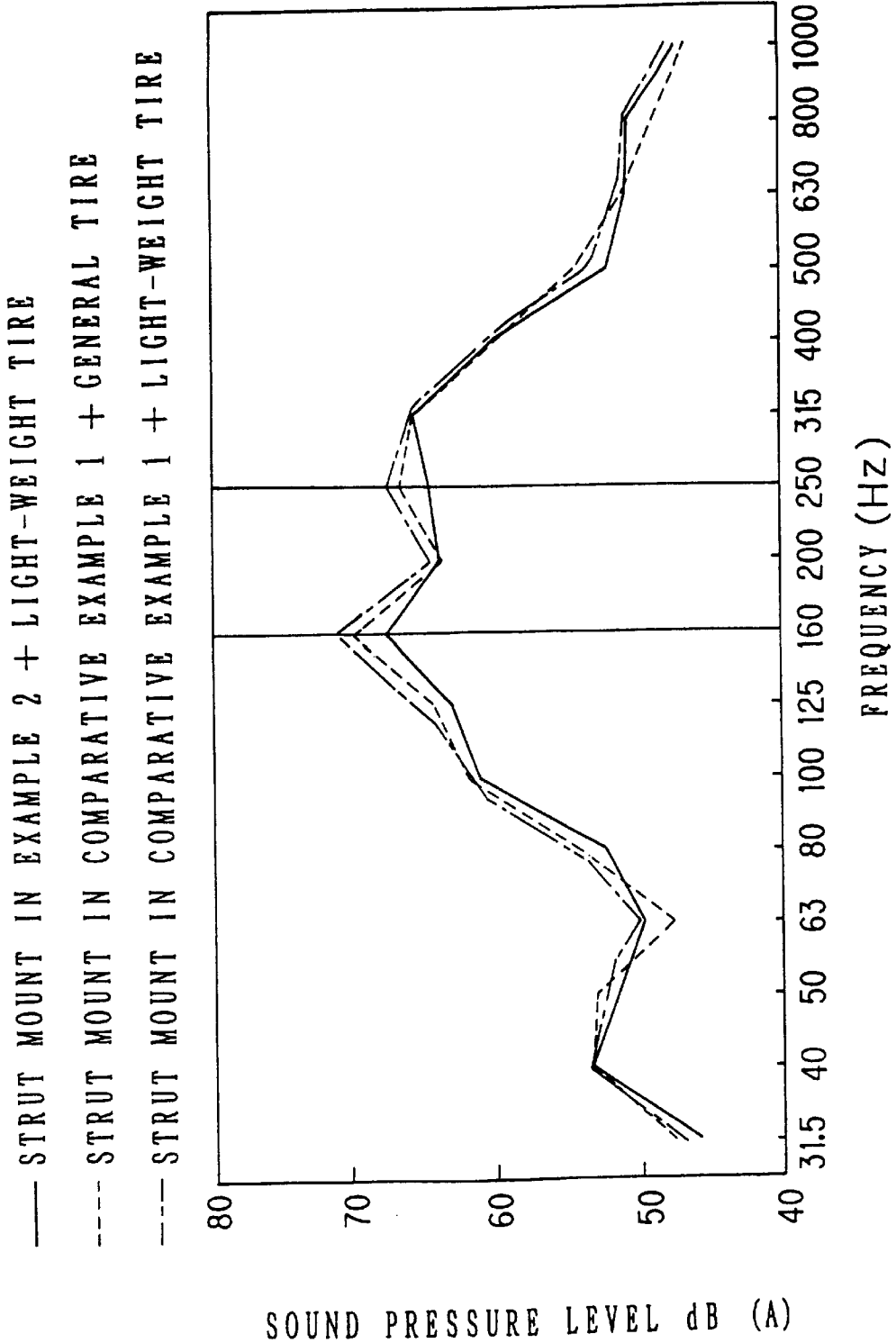

AUTOMOBILE VIBRATION-ISOLATING RUBBER COMPOSITION AND AUTOMOBILE VIBRATION-ISOLATING DEVICE

BACKGROUND OF THE INVENTION

The present invention relates to a rubber composition which is preferably used as an automobile vibration-isolating rubber, and to an automobile vibration-isolating device having a strut mount obtained from the same.

A natural rubber composition or a rubber composition comprising a blend of a natural rubber and a polybutadiene rubber or a polystyrene-butadiene copolymer rubber has been hitherto used as an automobile vibration-isolating rubber of a strut mount, an engine mount, a body mount, a bush or the like.

In order to reduce a passenger compartment noise which is caused by road noise emanating from an automobile road surface, it is advisable that in a strut mount, for example, a dynamic spring constant in a high frequency region of from 100 to 300 Hz be decreased and a dynamic factor (dynamic-to-static modulus ratio) be closer to 1. Therefore, in the above-mentioned vibration-isolating rubber, a rubber composition comprising a natural rubber and a polybutadiene rubber has been recently often selected and used. However, since the polybutadiene rubber which has been used to date is produced in the presence of a cobalt catalyst or a nickel catalyst and has a cis content of less than 97%, an effect of a decrease in the dynamic factor is not sufficient as will be later described, and a satisfactory decrease in the dynamic factor has been in demand.

Especially, as an automobile weight is reduced to meet social demands for energy saving and exhaust gas control in recent years, there is a growing tendency that a rolling resistance of a tire is decreased or a weight of a tire is reduced. However, a tire having the low rolling resistance or the light-weight tire generally tends to increase the road noise. Thus, the decrease in the dynamic factor has been in high demand.

SUMMARY OF THE INVENTION

The present invention is to provide an automobile vibration-isolating rubber composition of which the dynamic factor is decreased more than as usual.

The present inventors have assiduously conducted investigations to solve the above-mentioned problems, and have consequently found that the predetermined object can be achieved especially by selecting a specific polybutadiene rubber having a high cis content and forming a rubber composition containing a specific amount of this polybutadiene rubber. This finding has led to the completion of the present invention.

That is, in the automobile vibration-isolating rubber composition of the present invention, a rubber component, which is to be vulcanized, comprises from 10 to 80% by weight of a polybutadiene rubber which is obtained through the polymerization using a rare-earth element catalyst and which has a cis content of 97% or more, and from 90 to 20% by weight of at least one type of a rubber selected from a natural rubber, a synthetic polyisoprene rubber and a polystyrene-butadiene copolymer rubber.

In this construction, a vibration-isolating rubber composition having a dynamic factor which is lower than that of a conventional material can be designed. When this composition is used in an automobile vibration-isolating rubber, it is possible to decrease a automobile passenger compartment noise caused by road noise.

The automobile vibration-isolating rubber composition of the present invention preferably contains carbon black having a nitrogen adsorption specific surface area (hereinafter referred to as "$N_2SA$") of 40 $m^2/g$ or less and a dibutyl phthalate oil absorption (hereinafter referred to as "DBP oil absorption") of 80 ml/100 g or more, and a compound represented by formula (1), in addition to the rubber component.

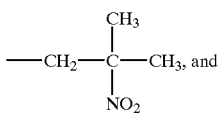

The compound of formula (1) is a coupling agent by which to couple a rubber and carbon black. The specific coupling agent and the specific carbon black are incorporated with the above-mentioned rubber component, making it possible to extremely increase the effect of the decrease in the dynamic factor.

The automobile vibration-isolating device of the present invention has a strut mount obtained from the above-mentioned automobile vibration-isolating rubber composition in an automobile having light-weight radial tires for a passenger car (hereinafter referred to as "light-weight tires") or radial tires for a passenger car having low rolling resistances (hereinafter referred to as "low rolling resistance tires").

Since the vibration-isolating rubber composition of the present invention has the excellent effect of the decrease in the dynamic factor as stated above, the vibration-isolating device having the strut mount obtained from the rubber composition in the present invention does not increase the road noise even when the automobile has the light-weight tires or the low rolling resistance tires. Especially when the above-mentioned specific carbon black and coupling agent are used in combination, the dynamic factor of the strut mount is extremely low, and the effect of the decrease in the load noise is therefore quite excellent. Accordingly, the automobile vibration-isolating device of the present invention can decrease the weight of the tire or decrease the fuel consumption without increasing the road noise. That is, it can meet the social demands for reduction of the automobile weight and the energy saving without increasing the room noise in running.

In the vibration-isolating device of the present invention, the strut mount may be a liquid-filled strut mount which has a liquid chamber wherein the vibration-isolating rubber constitutes a part of a chamber wall and which damps the vibration through an elasticity of the vibration-isolating rubber and a liquid-flowing effect.

BRIEF DESCRIPTION OF THE DRAWINGS

FIG. 4 is a graph showing a relationship between a frequency and a sound pressure level in an actual car test of strut mounts obtained from vibration-isolating rubber compositions in Example 2 and Comparative Example 1.

DETAILED DESCRIPTION OF PREFERABLE EMBODIMENTS

Figure 1:
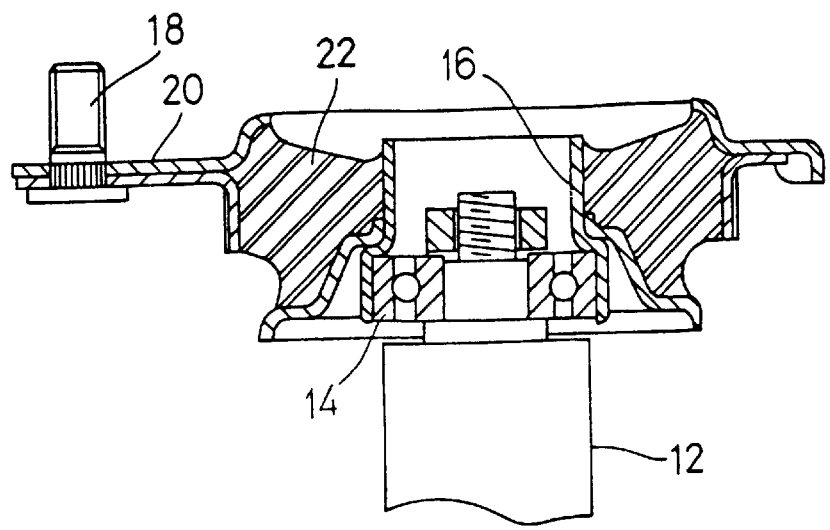
FIG. 1 is a sectional view showing an example of a strut mount obtained from an automobile vibration-isolating rubber composition of the present invention.

In the automobile vibration-isolating rubber composition of the present invention, the polybutadiene rubber containing as high as 97% or more of a cis which is a rubber component of a vulcanized rubber can usually be formed through the polymerization using a rare-earth element catalyst. As the rare-earth element catalyst, a neodymium catalyst is preferably used. For example, a polybutadiene rubber having a cis content of 98% (Neocis BR, made by Enichem Elastmeri, and Buna CB, made by Bayer AG) which is produced in the presence of a neodymium catalyst is preferable.

The amount of the polybutadiene rubber having the cis content of 97% or more in the rubber component is between 10 and 80% by weight, preferably between 20 and 40% by weight. When this amount is less than 10% by weight, the effect of the decrease in the dynamic factor is insufficient, and a compression set and a fatigue resistance tend to decrease. When the amount is more than 80% by weight, a strength and an elongation are notably decreased, and a mill processability is poor. Thus, it is not practical.

As the other rubber of the rubber component with which the polybutadiene rubber having the cis content of 97% or more is blended, a natural rubber, a synthetic polyisoprene rubber and a polystyrene-butadiene copolymer rubber are used either singly or in combination. The amount of the other rubber in the rubber component is between 90 and 20% by weight, preferably between 80 and 60% by weight.

The compound of formula (1) is preferably N,N'-bis(2-methyl-2-nitropropyl)-1,6-diaminohexane. The amount of this coupling agent is preferably between 0.5 and 4.0 parts by weight per 100 parts by weight of the rubber component.

Carbon black, as stated above, has preferably $N_2SA$ of 40 $m^2/g$ or less and a DBP oil absorption of 80 ml/100 g or more. When the $N_2SA$ is higher than 40 $m^2/g$, the dynamic factor is increased. When the DBP oil absorption is less than 80 ml/100 g, a static spring constant is decreased if the amount of the carbon black is fixed, and the dynamic spring constant is increased if the static spring constant is fixed. Thus, in both cases the effect of the decrease in the dynamic factor is insufficient. The preferable amount of such a specific carbon black is between 20 and 80 parts by weight per 100 parts by weight of the rubber component.

The automobile vibration-isolating rubber composition of the present invention can contain, besides the above-mentioned components, various known additives which are incorporated into the usual rubber composition, namely, the usual carbon black other than the above-mentioned specific carbon black, zinc oxide, stearic acid, sulfur, a vulcanization accelerator, a softening agent and an antioxidant as required.

The automobile vibration-isolating rubber composition of the present invention can be obtained by blending the polybutadiene rubber obtained through the polymerization in the presence of the rare-earth element catalyst and having the cis content of 97% or more with the above-mentioned other diene rubber such as the natural rubber or the like to form the rubber component, adding the above-mentioned various additives, preferably, the specific carbon black and the specific coupling agent to the rubber component, and kneading the mixture in a usual manner. When this rubber composition is vulcanized under known vulcanization conditions, an automobile vibration-isolating rubber can be formed.

The thus-obtained automobile vibration-isolating rubber has the high effect of the decrease in the dynamic factor and can reduce the room noise which is caused by the road noise given from the automobile road surface.

Accordingly, the automobile vibration-isolating device of the present invention which has the strut mount obtained from this vibration-isolating rubber composition can prevent the above-mentioned increase in the road noise even if the automobile is fitted with the light-weight tires or the low rolling resistance tires. That is, the increase in the road noise with the conventional vibration-isolating device when the automobile is fitted with the light-weight tires or the low rolling resistance tires can be offset upon using the vibration-isolating device of the present invention, and the road noise can be more reduced. Especially when using the rubber composition containing the above-mentioned specific coupling agent and specific carbon black, such an effect in the decrease of the road noise is quite excellent.

The light-weight tire refers to, for example, a radial tire of which the weight is reduced by 10% or more compared to a conventional radial tire for a passenger car (hereinafter referred to as "a general tire"). This reduction of the weight is conducted, for example, by forming a carcass with 1 ply and reducing thicknesses of a tread, a side portion and a bead by from 10 to 20%.

The low rolling resistance tire refers to a low fuel consumption tire which is a radial tire in which a coefficient of a rolling resistance [=(rolling resistance/longitudinal load)× 100] is 1.0 or less while that of a general tire is 1.5 or more and the rolling resistance is thus low.

An example of the strut mount obtained from the rubber composition of the present invention is as shown in FIG. 1. This strut mount 10 comprises a main body fitting 16, an installation fitting 20 installed on the automobile main body with a bolt 18, and an vibration-isolating rubber 22 which is disposed between the main body fitting 16 and the installation fitting 20 to communicate these fittings resiliently. The main body fitting 16 has a cylindrical body, into which a top of a strut rod 12 is introduced, and is mounted on the top through a bearing 14. The vibration-isolating rubber 22 is formed by vulcanizing the automobile vibration-isolating rubber composition of the present invention.

As the strut mount, a liquid-filled strut mount which has a liquid chamber wherein the vibration-isolating rubber constitutes a part of the chamber wall and which damps the vibration by the elasticity of the vibration-isolating rubber and the liquid-flowing effect can also be used.

Figure 2:
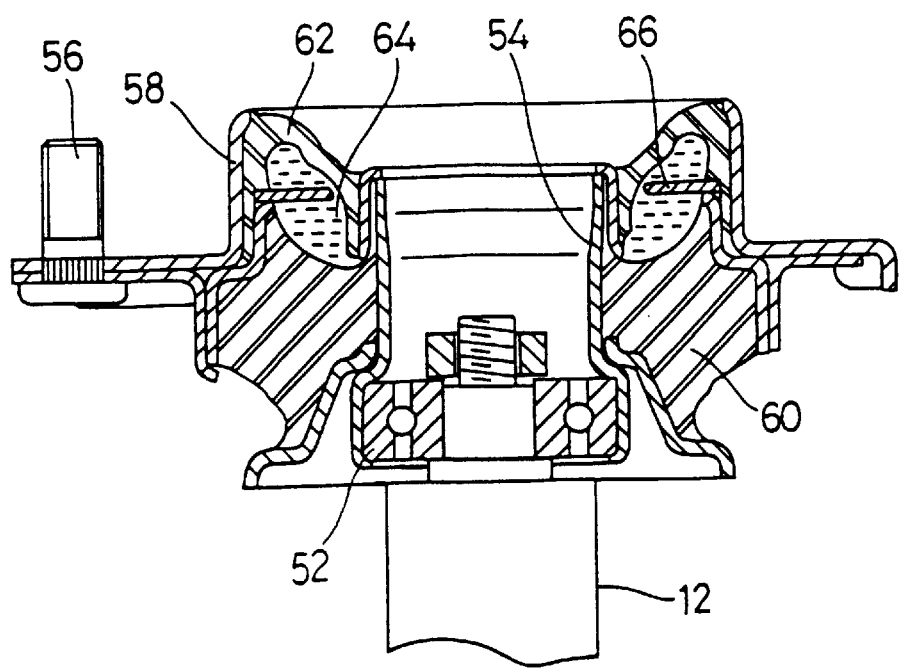
FIG. 2 is a sectional view showing an example of a liquid-filled strut mount obtained from an automobile vibration-isolating rubber composition of the present invention.

FIG. 2 shows an example of a liquid-filled strut mount 50. This strut mount 50 comprises a main body fitting 54, an installation fitting 58 installed on the automobile main body with a bolt 56, an vibration-isolating rubber 60 which is disposed between the main body fitting 54 and the installation fitting 58 to communicate these fittings resiliently, and a diaphragm 62 mounted between the main body fitting 54 and the installation fitting 58. The main body fitting 54 has a cylindrical body, into which a top of a strut rod 12 is introduced, and is mounted on the top through a bearing 52. A liquid chamber 64 filled with a liquid is formed within the mount by the vibration-isolating rubber 60 and the diaphragm 62. This liquid chamber 64 is divided into two chambers which are vertically communicated through a hollow disc partition plate 66. The vibration-isolating rubber 60 is formed by vulcanizing the automobile vibration-isolating rubber composition of the present invention.

When the liquid-filled strut mount having the above-mentioned structure is used, it is possible to further decrease the dynamic factor by the effect of the decrease in the dynamic factor with the vibration-isolating rubber and the liquid-flowing effect.

The present invention is illustrated more specifically by referring to the following Examples and Comparative Examples.

EXAMPLES 1 TO 9 AND COMPARATIVE EXAMPLES 1 AND 2

The components shown in Table 1 were blended, and the following additives were added thereto. The mixture was kneaded by a usual method. In this manner, a total of 11 rubber compositions shown in Examples 1 to 9 and Comparative Examples 1 and 2 were prepared.

|  | parts by weight |
|---|---|
| rubber component | 100 (refer to Table 1) |
| carbon black | (refer to Table 1) |
| coupling agent | (refer to Table 1) |
| aromatic oil | 3 |
| zinc oxide | 5 |
| stearic acid | 1 |
| antioxidant (6C) | 2 |
| sulfur | 3.5 |
| vulcanization accelerator (CBS) | 1 |

In Table 1, "Nd—BR" and "Co—BR" are as follows.

Nd—BR: polybutadiene rubber formed through the polymerization in the presence of a neodymium catalyst and having a cis content of 98% (Neocis BR60, made by Enichem Elastomeri)

Co—BR: polybutadiene rubber formed through the polymerization in the presence of a neodymium catalyst and having a cis content of 96% (Ube Pol 150B, made by Ube Industries, Ltd.)

The $N_2SA$ and the DBP oil absorption of carbon blacks A to D are as follows.

| Carbon black A: | $N_2SA = 26$ m$^2$/g, DBP oil absorption = 87 ml/100 g |
|---|---|
| Carbon black B: | $N_2SA = 28$ m$^2$/g, DBP oil absorption = 154 ml/100 g |
| Carbon black C: | $N_2SA = 42$ m$^2$/g, DBP oil absorption = 115 ml/100 g |
| Carbon black D: | $N_2SA = 27$ m$^2$/g, DBP oil absorption = 68 ml/100 g |

N,N'-bis(2-methyl-2-nitropropyl)-1,6-diaminohexane was used as a coupling agent.

This rubber composition was then vulcanized at a vulcanization temperature of 150° C. for 25 minutes to form a test piece having a diameter of 50 mm and a thickness of 25 mm. This test piece was measured for dynamic properties (static spring constant, dynamic spring constant and dynamic factor). Further, the rubber composition was vulcanized at 150° C. for 15 minutes to form a test sample. This test sample was measured for properties (rubber hardness, tensile strength and elongation) and a mill processability. The results are shown in Table 1.

TABLE 1

|  | Ex. 1 | Ex. 2 | Ex. 3 | Ex. 4 | Ex. 5 | Ex. 6 |
|---|---|---|---|---|---|---|
| Rubber component |  |  |  |  |  |  |
| Natural rubber | 80 | 80 | 60 | 20 | 80 | 80 |
| Nd—Br | 20 | 20 | 40 | 80 | 20 | 20 |
| Co—BR | — | — | — | — | — | — |
| Carbon black A | 60 | — | 60 | 60 | 60 | 60 |
| B | — | 50 | — | — | — | — |
| C | — | — | — | — | — | — |
| D | — | — | — | — | — | — |
| Coupling agent | 1.5 | 1.5 | 1.5 | 1.5 | 4.0 | 0.5 |
| Hardness of rubber (JIS-A) | 67 | 67 | 69 | 70 | 68 | 65 |
| Tensile strength (MPa) | 20.9 | 20.5 | 16.3 | 11.4 | 20.4 | 20.4 |
| Elongation (%) | 390 | 330 | 280 | 250 | 370 | 420 |
| Mill processability | ◯ | ◯ | ◯ | Δ | ◯ | ◯ |
| Static spring constant (N/mm) | 635 | 643 | 654 | 662 | 650 | 611 |
| Dynamic spring constant (N/mm) | 920 | 881 | 936 | 927 | 878 | 950 |
| Dynamic factor | 1.45 | 1.37 | 1.43 | 1.40 | 1.35 | 1.55 |
| Effect of decrease in dynamic factor | ⊚ | ⊚ | ⊚ | ⊚ | ⊚ | ⊚ |

|  | Ex. 7 | Ex. 8 | Ex. 9 | CEx. 1 | CEx. 2 |
|---|---|---|---|---|---|
| Rubber component |  |  |  |  |  |
| Natural rubber | 80 | 80 | 80 | 100 | 80 |
| Nd—Br | 20 | 20 | 20 | — | — |
| Co—BR | — | — | — | — | 20 |
| Carbon black A | — | 60 | — | 60 | 60 |
| B | — | — | — | — | — |

TABLE 1-continued

| | | | | | |
|---|---|---|---|---|---|
| C | 50 | — | — | — | — |
| D | — | — | 65 | — | — |
| Coupling agent | 1.5 | — | — | — | — |
| Hardness of rubber (JIS-A) | 67 | 65 | 63 | 64 | 64 |
| Tensile strength (MPa) | 21.3 | 20.9 | 18.5 | 23.5 | 19.6 |
| Elongation (%) | 370 | 420 | 410 | 450 | 430 |
| Mill processability | ○ | ○ | ○ | ○ | ○ |
| Static spring constant (N/mm) | 632 | 602 | 584 | 590 | 592 |
| Dynamic spring constant (N/mm) | 1023 | 988 | 969 | 1067 | 1040 |
| Dynamic factor | 1.62 | 1.64 | 1.66 | 1.81 | 1.76 |
| Effect of decrease in dynamic factor | ○ | ○ | ○ | x | x |

Ex.—Example, CEx.—Comparative Example

Methods of measuring the above-mentioned properties are as follows.

Static spring constant:

The above-mentioned test piece was compressed with a deflection amount of from 0 to 5 mm twice at a crosshead speed of 10 mm/min using a measuring device Tensilon (manufactured by Orientech K. K.). A load-deflection curve in the second compression was drawn, and the static spring constant was calculated according to the following equation.

Static spring constant $(N/mm) = (w_2 - w_1)/(\delta_2 - \delta_1)$ wherein $w_1$ is a load when a deflection amount ($\delta_1$) is 1.3 mm, and $w_2$ is a load when a deflection amount ($\delta_2$) is 3.8 mm.

Dynamic spring constant:

The test piece was compressed with a preload of 780 N, a frequency of 100 Hz and an amplitude of ±0.05 mm using a measuring device Dynamic SERVO (manufactured by Saginomiya Seisakusho Inc.), and the dynamic spring constant of the test piece was calculated according to the method prescribed in JIS K6394.

Dynamic factor:

The dynamic factor was evaluated in terms of a ratio of the dynamic spring constant to the static spring constant (dynamic spring constant/static spring constant) as measured by the above-mentioned methods. The smaller value of this dynamic factor is more advantageous to reduce the automobile room noise.

Hardness, tensile strength and elongation:

These properties were measured in accordance with JIS K6301.

Mill processability:

The mill processability was evaluated in terms of a windability onto a 10-inch roll according to the following standard. ○: good mill processability Δ: poor mill processability As is apparent from Table 1, the rubber compositions in Examples 1 to 9 which were formed by blending the natural rubber with the polybutadiene rubber having the cis content of 98% and obtained through the polymerization in the presence of the neodymium catalyst exhibited the low dynamic factor and the large effect of the decrease in the dynamic factor compared to the rubber compositions in Comparative Examples 1 and 2. Especially, the rubber compositions in Examples 1 to 6 which contained both the specific coupling agent and the specific carbon black (A or B) exhibited the very low dynamic factor and the excellent effect of the decrease in the dynamic factor.

The strut mounts shown in FIG. 1 were formed using the rubber compositions in Examples 1 and 2 and Comparative Example 1, and were measured for the dynamic properties. The results are shown in Table 2.

TABLE 2

| Type of a rubber composition | | Example 1 | Example 2 | Comparative Example 1 |
|---|---|---|---|---|
| Static spring constant (N/mm) | | 733 | 749 | 699 |
| Dynamic spring constant (N/mm) | | 1273 | 1163 | 1510 |
| Absolute spring constant (N/mm) | | 1549 | 1387 | 1946 |
| Dynamic factor | Dynamic spring constant/static spring constant | 1.74 | 1.60 | 2.16 |
| | Absolute spring constant/static spring constant | 2.12 | 1.85 | 2.78 |

The static spring constant and the dynamic spring constant in Table 2 were measured under the same conditions as those in Table 1. That is, with respect to the static spring constant, a load of from 0 to 29,000 N was exerted three times on the strut mount in the axial direction of the rod 12 in FIG. 1 at a crosshead speed of 20 mm/min. The static spring constant was calculated with respect to a load of from 1,755 N to 5,265 N in a load-deflection curve in the third compression. Further, the dynamic spring constant was measured with a preload of 3,510 N, a frequency of 100 Hz and an amplitude of ±0.05 mm. The absolute spring constant was measured with a preload of 3,510 N, a frequency of 300 Hz and an amplitude of 5 G (fixed).

As is apparent from Table 2, the strut mounts obtained from the rubber compositions in Example 1 and 2 had the low dynamic spring constant and the low absolute spring constant compared to the strut mount obtained from the rubber composition in Comparative Example 1. Therefore, the dynamic factor was low with respect to the ratio of the dynamic spring constant to the static spring constant and the ratio of the absolute spring constant to the static spring constant. The order of the dynamic factor of the test pieces shown in Table 1 (Example 2<Example 1<<Comparative Example 1) was maintained also in the dynamic factor (dynamic spring constant and absolute spring constant) in the strut mounts shown in Table 2. Accordingly, it was found that in Examples 3 to 9, as in Examples 1 and 2, the effect of the decrease in the dynamic factor was high when using the strut mounts.

The strut mounts obtained from the rubber compositions in Example 2 and Comparative Example 1 were installed in an automobile, and an actual automobile test was conducted to identify the effect of the decrease in the road noise.

A sound level at a speed of 60 km/hour was measured using an Front Engine Front Drive car of 1,500 cc. A microphone was placed near the ear on the side of the front sheet of the car. The results are shown in Table 4.

Figure 3:
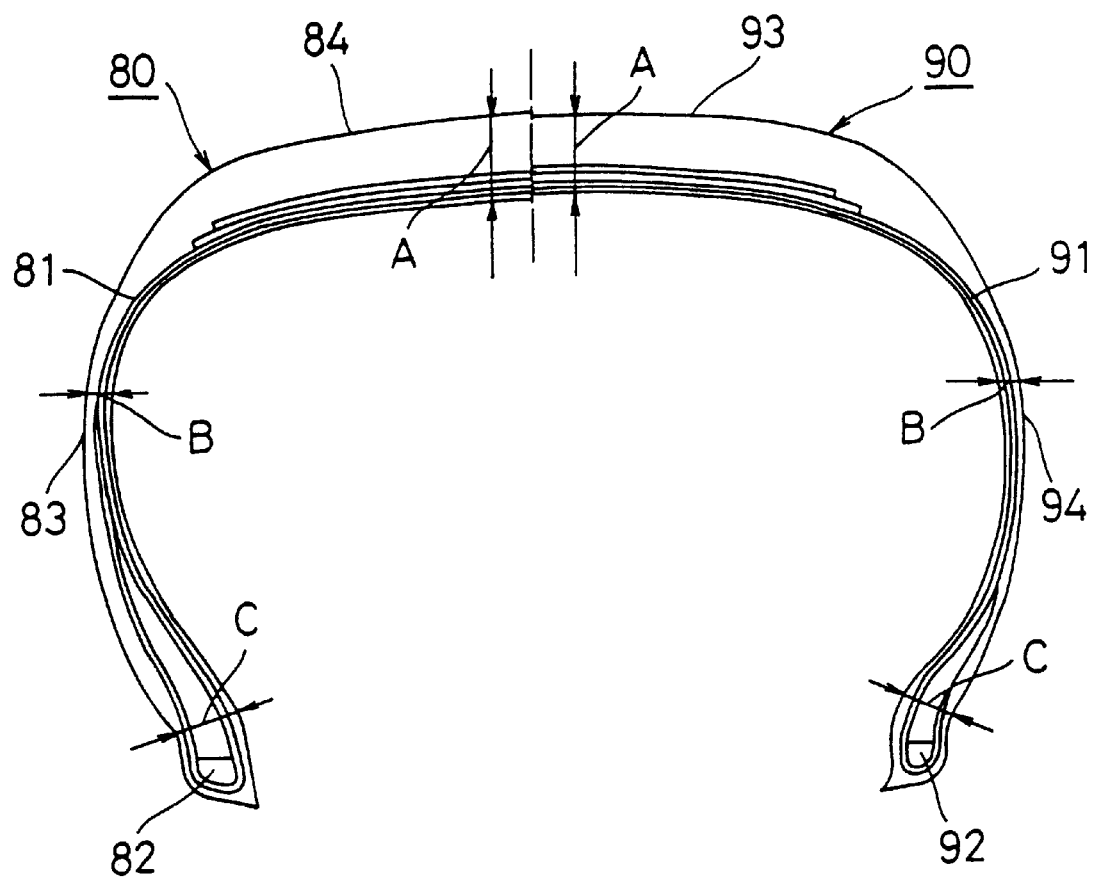
FIG. 3 is a sectional view of structures of a light-weight tire and a general radial tire.

A general tire and a light-weight tire shown in Table 3 were used as a tire mounted on the car. The size of these two tires was 175/70R13 82S. The half sections of the two tires are shown in FIG. 3. That is, the section on the left side is a section of a general tire 80, and the section on the right side is a section of a light-weight tire 90. As shown in FIG. 3, in the general tire 80, a carcass 81 is made of 1 ply; it is much folded from a bead 82 and is turned up to a center of a side portion 83. The thicknesses in normal directions of the tread 84, the side portion 83 and the bead 82 are A=15.0 mm, B=5.0 mm and C=10.0 mm respectively. On the other hand, in the light-weight tire 90, a carcass 91 is made of 1 ply; it is slightly folded in a bead 92, and the folding is terminated at a lower portion of the bead 92. The thicknesses in normal directions of the tread 93, the side portion 94 and the bead 92 are A=13.5 mm, B=4.0 mm and C=8.5 mm respectively. The thicknesses of the light-weight tire 90 are smaller than those of the general tire 80 by from 10 to 20%. Consequently, as shown in Table 3, the weight of the light-weight tire 90 is reduced by 10% compared to the weight of the general tire 80.

Further, the coefficient of the rolling resistance (index) of the light-weight tire 90 is, as shown in Table 3, 65, whereas that of the general tire 80 is 100. Thus, the light-weight tire 90 is a low rolling resistance tire. Incidentally, both of the tires are equal with respect to a radial spring constant, a transverse spring constant, a cornering power and a self-aligning torque.

TABLE 3

| Item | Tire | |
|---|---|---|
| | General tire | Light-weight tire |
| Weight of a tire (kg) | 6.6 | 5.5 |
| Radial spring constant (N/mm) | 162 | 160 |
| Transverse spring constant (N/mm) | 89 | 75 |
| Cornering power (kN/deg) | 0.677 | 0.677 |
| Self-aligning torque (N · m) | 30 | 34 |
| Thickness of a tread (mm) A | 15.0 | 13.5 |
| Thickness of a side portion (mm) B | 5.0 | 4.0 |
| Thickness of a bead (mm) C | 10.0 | 8.5 |
| Coefficient of rolling resistance (index) | 100 | 65 |

A rim used was 13×5½–JJ, and an air pressure was 200 kPa (2.0 kgf/cm$^2$).

As shown in FIG. 4, when the light-weight tires were mounted on the car having the strut mounts in Comparative Example 1, the sound pressure level was increased by 1 dB near 160 Hz and 250 Hz compared to the case where the general tires were mounted thereon. On the other hand, when the light-weight tires were mounted on the car having the strut mounts in Example 2, the sound pressure level was decreased by 2 dB near 160 Hz and 250 Hz compared to the case where the general tires were mounted on the car having the strut mounts in Comparative Example 1. Further, in the evaluation of sensitivity as well, the effect of the improvement in the road noise was identified.

Thus, when the light-weight tires were mounted on the car, the road noise was decreased upon using the strut mounts in Example 2. Accordingly, the light-weight tires can preferably be used.

What we claim is:

1. A vibration-isolating rubber assembly, comprising a vibration-isolating rubber member and a metal member, in which a dynamic factor is not larger than about 1.7, said dynamic factor being defined as a ratio of dynamic spring constant to static spring constant.

2. The vibration-isolating rubber assembly of claim 1, wherein said dynamic factor is not larger than about 1.6.

3. The vibration-isolating rubber assembly of claim 1, wherein said vibration-isolating rubber member is comprised of a polybutadiene rubber polymerized in the presence of a neodymium catalyst.

4. The vibration-isolating rubber assembly of claim 2, wherein said vibration-isolating rubber member is comprised of a polybutadiene rubber polymerized in the presence of a neodymium catalyst.

5. The vibration-isolating rubber assembly of claim 1, wherein said vibration-isolating rubber member is comprised of a polybutadiene rubber which has a cis content of at least about 98%.

6. The vibration-isolating rubber assembly of claim 2, wherein said vibration-isolating rubber member is comprised of a polybutadiene rubber which has a cis content of at least about 98%.

7. The vibration-isolating rubber assembly of claim 1, wherein said vibration-isolating rubber member contains a carbon black having a nitrogen adsorption specific surface area of no greater than 40m$^2$/g and a dibutyl phthalate oil absorption of at least 80 ml/100 g.

8. The vibration-isolating rubber assembly of claim 2, wherein said vibration-isolating rubber member contains a carbon black having a nitrogen adsorption specific surface area of no greater than 40m$^2$/g and a dibutyl phthalate oil absorption of at least 80 ml/100 g.

9. The vibration-isolating rubber assembly according to claim 1, wherein said vibration-isolating rubber member contains a compound represented by a formula:

wherein:
R represents:

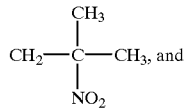

n is between 2 and 12.

10. The vibration-isolating rubber assembly according to claim 2, wherein said vibration-isolating rubber member contains a compound represented by a formula:

wherein:

R represents:

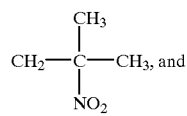

n is between 2 and 12.

11. The vibration-isolating rubber assembly according to claim 1, wherein said vibration-isolating rubber assembly comprises one of a rubber bush, a cylindrical bush, a mount, a support, and a cradle mount.

12. The vibration-isolating rubber assembly according to claim 2, wherein said vibration-isolating rubber assembly comprises one of a rubber bush, a cylindrical bush, a mount, a support, and a cradle mount.

\* \* \* \* \*